Dec. 6, 1966  D. E. BRZEZINSKI ETAL  3,289,797
ROTARY MOTION CONTROL DEVICE
Filed Sept. 10, 1962  3 Sheets-Sheet 2
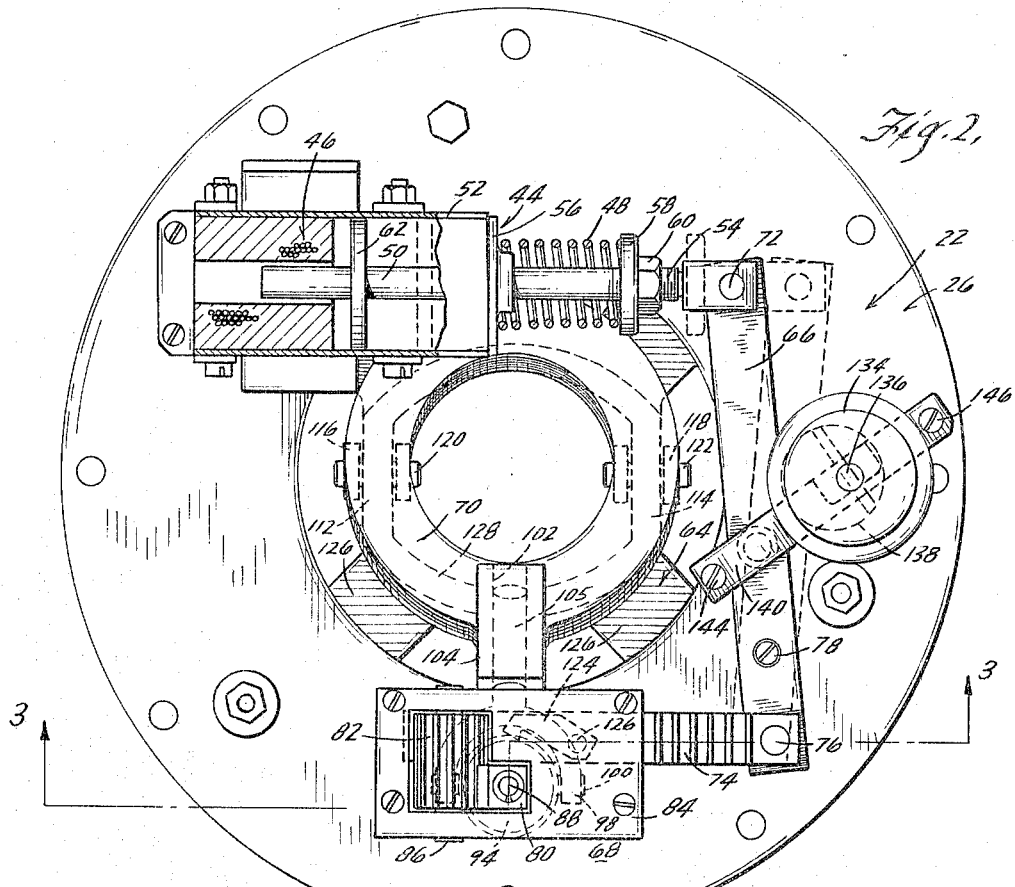
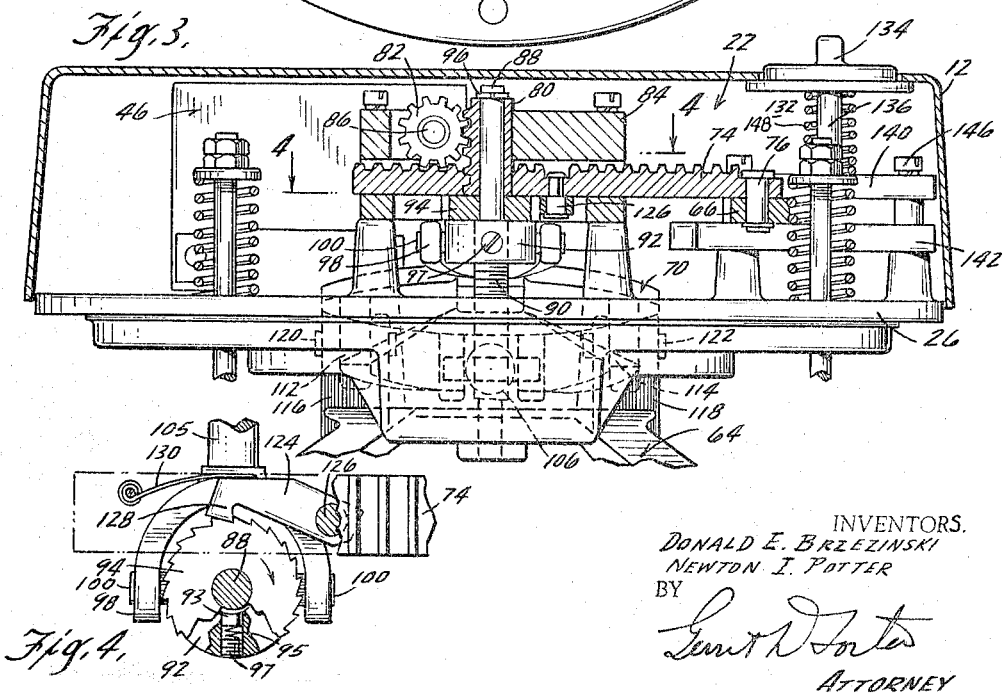
INVENTORS.
DONALD E. BRZEZINSKI
NEWTON I. POTTER
BY
*Gerrit D. Foster*
ATTORNEY Dec. 6, 1966 D. E. BRZEZINSKI ETAL 3,289,797
ROTARY MOTION CONTROL DEVICE
Filed Sept. 10, 1962 3 Sheets-Sheet 3
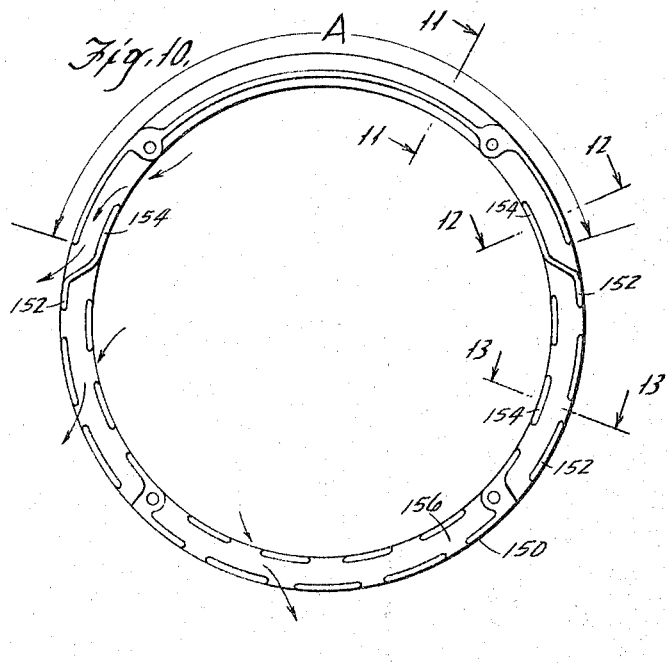
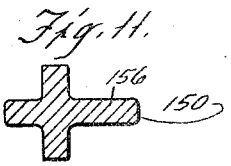
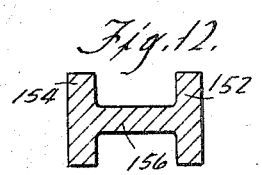
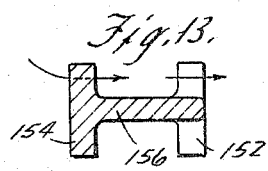
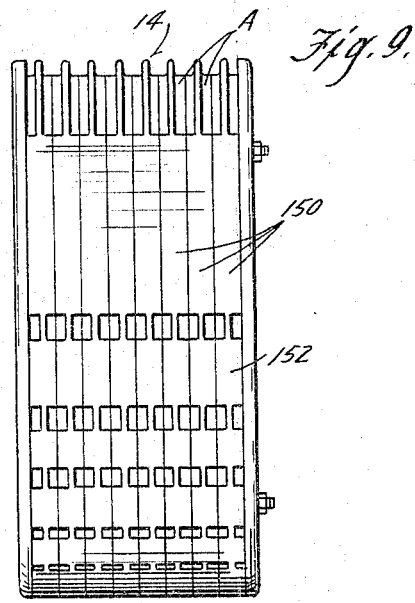
INVENTORS
DONALD E. BRZEZINSKI
NEWTON I. POTTER
BY
ATTORNEY United States Patent Office 3,289,797
Patented Dec. 6, 1966

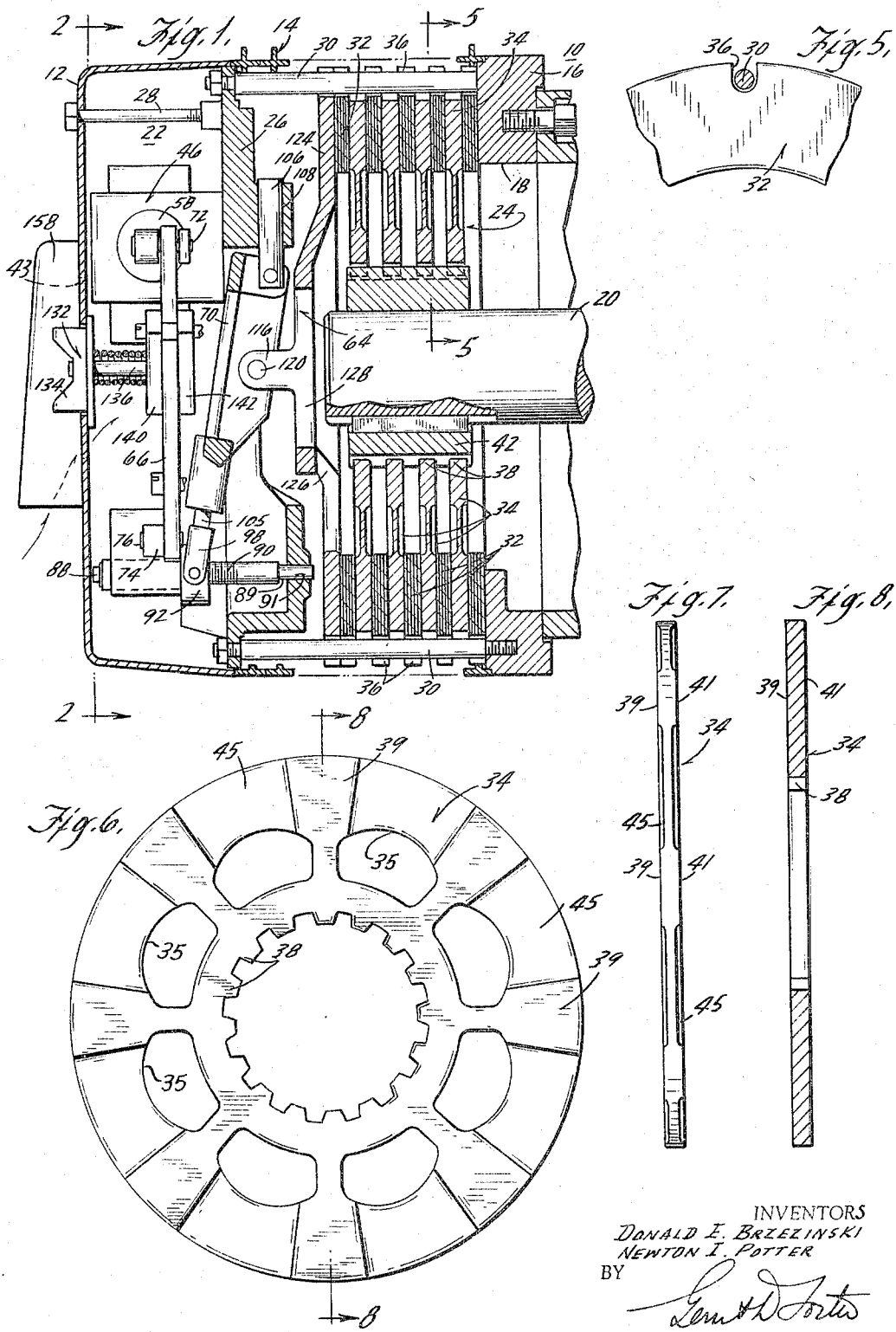

3,289,797
ROTARY MOTION CONTROL DEVICE
Donald E. Brzezinski, Milwaukee, and Newton I. Potter, Waukesha, Wis., assignors to Wehr Steel Company, West Allis, Wis., a corporation of Wisconsin
Filed Sept. 10, 1962, Ser. No. 222,507
21 Claims. (Cl. 188—171)

This invention relates to devices for controlling rotary motion such as brakes, clutches and the like and, more particularly, to an improved construction for a disk-type rotary motion control device and to an operator assembly particularly well suited for use in that device and which is effective to automatically compensate for wear while maintaining the applied torque, retarding torque in case of a brake, within a preselected range for optimum performance. The invention is shown and will be discussed as embodied in a brake assembly, however, it will be appreciated that it is not necessarily limited to such use.

Disk-type brakes have several well recognized and desirable features, such as their compactness and economy of construction, but they have presented problems particularly as to wear and thermal capacity.

With regard to the problem of disk wear, numerous proposed solutions to this problem have been made in the past; however, they have usually accomplished wear adjustment at the expense of available torque in that as disk wear occurs and is compensated for the amount of applied torque is decreased. For example, taking the most commonly accepted brake design, a pressure plate is used to apply the retarding torque to the disks. The pressure plate is activated by a solenoid release-spring set operator assembly wherein the spring, or springs, supply the retarding force and bias the pressure plate toward clamping engagement with the disks and the solenoid acts against the spring force to release the brake when the solenoid is energized. The spring, or springs, act directly on the pressure plate and as such must be of sufficient size to exert the force necessary to provide the desired retarding torque and, it will be appreciated, that when the pressure plate is moved to compensate for disk wear, the spring force will be reduced.

We propose to compensate for wear without reducing the available torque by affecting wear adjustment independently of the force generating mechanism, i.e. in the example above independently of the solenoid and spring. In accordance with our proposal, the force generating mechanism is connected to the pressure plate by an arrangement which establishes a direct driving connection between the force generating mechanism and the pressure plate and which also provides for adjustable movement of the pressure plate independently of the force generating mechanism so that the position of the pressure plate relative to the disks can be adjusted independently of and without affecting the force generating mechanism. With such an arrangement, the brake setting member, the spring above, can be connected to operate in a preselected range for optimum performance and that range is maintained even though wear is compensated for. Such an arrangement is particularly well suited to the inclusion of force multiplying means between the force generating mechanism and the pressure plate and it is preferred that such means be utilized so that relatively lightweight elements can be used in the force generating mechanism.

Thermal capacity is related to the amount of inertia which can be effectively handled by a brake and as such provides a measure of the amount of inertia that can be brought to a stop in a given time. Of the presently available brakes, the only constructions exhibiting thermal capacities in the upper ranges are the external-shoe-type brakes commonly used in industry and which, due to their construction, readily dissipate heat but are generally large and rather cumbersome. Past efforts to increase the thermal capacity of disk-type brakes have been unsatisfactory in that they have generally added to the complexity of the brake structure without producing an appreciable, or corresponding, increase in thermal capacity.

We have observed that brake operation is adversely affected by the presence of micro-high points on the disks, which create hot spots, as well as by the presence of dirt, dust or other foreign matter between the engaging faces of the disks. In accordance with this invention we propose to utilize a disk configuration which will break up these hot spots and will provide a more effective flow of air through the brake. More particularly, by providing the rotating disks with circumferentially spaced, raised disk engaging surfaces we have been able to break up the heat generation due to the high points. Moreover, with such a configuration the rotating disks act in the nature of an impeller directing cooling air through the brake and between the disks, i.e. over those areas of high heat generation; furthermore, such an air flow has a wiping action on the disk faces keeping them free of dirt, dust and other foreign matter. With such an arrangement we have been able to provide more effective brake operation and to increase the heat dissipating characteristics of the brake to such an extent as to approximately double the thermal capacity of disk-type brakes, this being accomplished without adding to the complexity of the brake structure.

Accordingly, an object of this invention is to increase the thermal capacity of a disk-type brake.

Another object of this invention is to compensate for wear in rotary motion control devices without affecting the amount of available torque.

A further object of this invention is to provide an operator assembly for use in combination with rotary motion control devices which provides for wear adjustment while maintaining a preselected applied torque.

More specific objects of this invention are to increase the heat dissipating properties of rotary motion control devices; and to utilize lightweight elements in the force generating mechanism and yet to achieve high applied torque.

A still further object of this invention is to achieve equally distributed and uniformly applied torque in rotary motion control devices.

Still another object of this invention is to provide a housing for rotary motion control devices which is readily adaptable to and facilitates assembly of various size devices.

A more general object of the invention is to achieve all of the foregoing objects while maintaining a compact and relatively simple and economical structure.

These and other objects and advantages will be pointed out in, or be apparent from the specification and claims, as will obvious modifications of the single embodiment shown in the drawings, in which:

FIG. 1 is an axial section through the brake;
FIG. 2 is a view generally along lines 2—2 of FIG. 1;
FIG. 3 is a partial section through the operator assembly generally along line 3—3 in FIG. 2;
FIG. 4 is a section generally along lines 4—4 of FIG. 3;
FIG. 5 is a section generally along lines 5—5 of FIG. 1;
FIG. 6 is a front elevation of one of the rotating disks;
FIG. 7 is an end view of the rotating disk;
FIG. 8 is a view generally along lines 8—8 of FIG. 6;
FIG. 9 is a side view of a portion of the outer housing of the brake;

FIG. 10 is a plan view of one of the disks of the outer housing portion;

FIG. 11 is a section generally along lines 11—11 of FIG. 10.

FIG. 12 is a section generally along lines 12—12 of FIG. 10; and

FIG. 13 is a section generally along lines 13—13 of FIG. 10.

With particular reference to FIG. 1, brake 10 includes an outer housing comprising a cover shield 12 and a shell assembly 14. End bracket 16 provides for connection of the brake to suitable apparatus and includes an aperture 18 through which shaft 20, from that apparatus, can extend for connection with the brake mechanism. Interiorly, the brake includes operator assembly 22 and a disk assembly 24. Operator assembly 22 includes a frame 26 having studs 28 extending through shield 12 to connect the shield and the operator assembly. Studs 30 extend from bracket 16 through disk assembly 24 and are anchored on frame 26 to complete the brake assembly.

Disk assembly 24 comprises a plurality of stationary disks 32 and a plurality of rotating disks 34 alternately arranged with the stationary disks. As can be seen in FIGS. 1 and 5, disks 32 include circumferentially spaced slots 36 for receiving studs 30 so that disks 32 are held stationary within the brake. With reference to FIGS. 1 and 6, each rotating disk 34 includes an inner opening provided with circumferentially arranged teeth 38 for engagement with mating teeth 40 provided on a hub 42 keyed to shaft 20. Thus, disks 34 are rotatable with shaft 20 and disks 32 are stationary and, as will be more completely described hereinafter, the disks are capable of limited axial movement relative to each other to provide for alternately setting and releasing the brake.

Preferably, the opposed surfaces of disks 34 have generally undulating configurations to provide circumferentially spaced, radially extending areas 39 and 41 for engagement with disks 32. These relatively spaced areas are effective to break up the hot spots due to micro-high points between the normally rotating and the normally stationary disks. It will be appreciated that these relatively spaced areas can be provided on disks 32, rather than on disks 34, if desired and still break up the hot spots; however, providing the areas on the normally rotating disks provides the additional advantage of the rotating disks acting in the nature of impellers to provide a more effective air flow through the brake. More particularly, rotating disks 34 include apertures 35, preferably aligned with the areas 45 intermediate areas 39 and 41, and disks 32 are annular. Shield 12 includes an opening 43 and shell 14 includes openings, which will be described more completely hereinafter, so that the brake housing is provided with air intake and exhaust openings. Accordingly, areas 39 and 41 function as impeller vanes when disks 34 rotate and direct a flow of air between the intake and exhaust openings and between disks 32 and 34. Hence, a self-impelled air flow is directed through the brake and in a manner to provide more effective cooling in that cooling air is directed over the main heat generating surfaces, the engaging surfaces of the disks. Furthermore, the cooling air so directed has a wiping action on the disk engaging areas to keep them free of dirt, dust and other foreign matter which would normally contribute to heat generation within the brake. Preferably disks 32 are the brake friction disks and disks 34 are the metallic disks, cast iron, so that the relatively spaced areas 39 and 41 can be provided without reducing the amount of available friction material. Furthermore, the use of the metallic disks as the normally rotating members a more even distribution of heat throughout the metallic disk is achieved minimizing the problem of disk warpage.

The alternate setting and releasing of the disk is accomplished through operator assembly 22 which includes force generating mechanism 44 comprising a solenoid 46 and an operator spring 48. Plunger 50 of the solenoid extends outwardly of solenoid housing 52 and includes a threaded portion 54. Plate 56 provides a seat for one end of operator spring 48 and a cup washer 58 provides an adjustable seat for the other end of the operator spring. The position of the cup washer relative to plate 56 can be adjusted through manipulation of nut 60, engaged on threaded portion 54, to vary the range in which spring 48 operates to adjust the spring force exerted by the spring as desired. The force generating mechanism is illustrated in a brake-released position with operator spring 48 compressed and solenoid 46 energized. Upon de-energization of the solenoid, spring 48 moves rod 50 to the right so that plate 62 occupies its dotted line position and also cup washer 58 is moved to its dotted line position and the brake is set.

The operator assembly also includes a pressure plate 64 arranged for movement into and out of clamping engagement with disk assembly 24. The connection between the pressure plate and the force generating assembly is established by a link 66, rack and pinion arrangement 68 and a pressure arm 70. More particularly, link 66 is pivotally connected to plunger 50 at point 72 and is pivotally connected to rack 74 at point 76. Link 66 is supported from a stud 78 so that it functions as a lever pivoted at a point intermediate its ends, stud 78, to transmit motion from the solenoid and operator spring to rack 74 with a force multiplication. In addition to rack 74, rack and pinion arrangement 68 includes a second rack 80 and a pinion 82 engaged between racks 74 and 80. Guide block 84 is carried on frame 26 and supports pinion 82 for rotation about shaft 86 and also provides a guide for movement of racks 74 and 80 at right angles to each other. Movement of the solenoid and operator spring is then effective to displace rack 80 vertically as viewed in FIG. 3.

A stud 88 extends through rack 80 and includes a threaded portion 90 on which is engaged a hub 92. A ratchet 94 is connected on stud 88 in fixed axial relation therewith intermediate hub 92 and rack 80 and a snap ring 96 is provided on stud 88 to engage the upper end of rack 80. The lower end 89 of stud 88 is movable in a guide hole 91 in frame 26 (see FIG. 1). In this manner stud 88 is connected for movement with rack 80 and is also capable of rotating within the rack.

Yoke 98 is pivotally connected to hub 92 by pins 100 and extends into a through hole 102 in portion 104 of pressure arm 70 so that the pressure arm is movable with the yoke and is also pivotally mounted on the elongated portion 105 of the yoke. A pin 106 is pivotally supported from pressure arm 70 and is positioned in a through hole 108 in frame 26 so that pin 106 is rotatable within and slideable axially of through hole 108. As can be seen in FIG. 2, pressure arm 70 includes a generally circular central portion 110 provided with depending portion 112 and 114. Pressure plate 64 includes U-shaped portions 116 and 118 which receive portions 112 and 114 with pins 120 and 122 providing a pivotal connection therebetween. Accordingly, pressure arm 70 acts as a lever pivoted at one end on pin 106, to transmit motion of hub 92, in response to motion of rack 80, to pressure plate 64 to alternately clamp and release the disk assembly.

Pressure plate 64 includes an annular portion 124 which engages the disk assembly (see FIG. 1). Ribs 126 connect the annular portion 124 to a central body 128 which carries the U-shaped portions 116 and 118. Pressure plate 64 also includes circumferentially arranged open slots 130 which, similar to slots 36 in disks 32, receive studs 30 and serve to guide the pressure plate into engagement with the disk assembly. It will also be noted that pressure arm 70 and pressure plate 64 are interconnected to form a rockable assembly capable of aligning the annular portion 124 of the pressure plate with the disk assembly to insure uniform and equal distribution of forces to the disk assembly regardless of any misalignment which may occur in the disk assembly. More particularly, the pressure plate and pressure arm are jointly movable in an axial direction relative to the disk assembly, they are jointly rotatable about an axis defined by pin 106 and portion 105 of the yoke, and the pressure plate is connected for pivotal movement relative to the pressure arm about an axis defined by pins 120 and 122 which extends normal to that about which the pressure arm and pressure plate are jointly pivotable, i.e. that defined by pin 106 and portion 105.

In operation the position of cup washer 58 is adjusted on rod 50 to set the range of movement for operator spring 48 to provide a particular spring force for a desired retarding torque. As shown in FIG. 1, the solenoid is energized, the operator spring compressed and the brake released. When the solenoid is de-energized operator spring 48, through rod 50, moves link 66 about pin 78 to its dotted line position. Rack 74 is moved to left turning pinion 82 clockwise which in turn moves rack 80 downwardly. Hub 92 is carried downwardly by stud 88, pivoting pressure arm 70 about its connection to pin 106 to force pressure arm 64 against the disk assembly to clamp the disks and set the brake. The brake will remain set until the solenoid is again energized whereupon plunger 50 will be moved to the left against spring 48 and move lever 66 to its full line position. This moves rack 74 to the right rotating pinion 82 counterclockwise to raise rack 80. Correspondingly, pressure arm 70 is pivoted upwardly raising pressure plate 64 to remove the pressure from the disk assembly and release the brake.

As wear occurs between the disks the amount of movement of pressure plate 64 necessary to engage and clamp the disk assembly will increase and, correspondingly, the extension of the operator spring also increases reducing the clamping force exerted on the disk assembly. Disk wear is adjusted for through an arrangement including ratchet 94 and pawl 124. More particularly, pawl 124 is connected to rack 74 by a pin 126 so that pawl 124 is movable with the rack. As rack 74 is moved to the left during setting movement of the brake, pawl 124 also moves relative to the ratchet. The length between adjacent ratchet notches is selected so that during normal operation the pawl will move on the face 128 of one notch without engaging another notch; however, as wear occurs between the disks the distance the pawl moves along the notch face will increase until wear exceeds a predetermined limit whereupon a subsequent ratchet notch will be engaged. With the pawl and ratchet engaged, movement of rack 74 to the right by energizing the solenoid turns the ratchet clockwise and, since the ratchet and stud are connected for joint rotation, stud 88 is rotated to move hub 92 and pressure arm 70 downwardly to position the pressure plate closer to the disk assembly. This decreases the amount of travel of the pressure plate necessary to set the brake and correspondingly, decreasing the amount of extension of the operator spring so that it again operates within the preselected range to exert the predetermined force. Leaf spring 130 (see FIG. 4) engages pawl 124 and holds it in engagement with ratchet 120. To prevent overspin of stud 88 during adjustment a locking arrangement comprising a nylon plug 93, a spring 95 and a set screw 97 is provided (FIG. 4). Nylon plug 93 engages stud 88 and prevents overspin while allowing adjusting movement and, further, prevents stud movement due to vibration.

Thus, in operation, the ratchet and pawl arrangement senses the amount of movement required to set the brake which movement determines the force exerted by the spring. When excessive disk wear has occurred whereby movement of the operator spring, and pressure plate, exceeds a predetermined limit the ratchet and pawl are engaged so that upon the brake release stroke of the solenoid the position of the pressure plate is adjusted. When the solenoid is de-energized the movement of the pressure plate required to set the brake is returned to normal and the operator spring again operates within the preselected range to provide the particular desired retarding torque. It will be appreciated that in the preferred embodiment illustrated the amount of disk wear to be tolerated before affecting an adjustment can be varied as desired by providing the necessary length between adjacent ratchet notches, i.e. length of face 128.

It will be noted that the force generating mechanism, both the operator spring and the solenoid, act through force multiplying means, i.e. lever 66, the rack and pinion arrangement 68 and the lever provided by the pivoted pressure arm, so that relatively lightweight elements can be utilized and still achieve sufficiently high retarding torques. More particularly, since operator spring 48 acts through the force multiplying means it does not have to be sufficiently large size to exert the force necessary to produce a particular retarding torque, on the contrary, the spring can be relatively lightweight with the force multiplying means increasing the spring force to sufficient magnitude to produce the desired retarding torque. Further, the use of a lightweight spring allows the use of a smaller solenoid since the force which it must act against is relatively less.

Means 132 is provided for manually releasing the brake when desired and includes a knob 134 carrying a shaft 136. A disk 138 is eccentrically connected to shaft 136 for rotation therewith and is held in alignment with link 66 by guide bars 140 and 142 disposed on opposite sides of the disk and mounted on frame 26 by studs 144 and 146. A coil spring 148 (see FIG. 3) biases disk 138 in a clockwise direction about shaft 136. When the brake is set, it can be manually released by rotating knob 134 counterclockwise to engage eccentric disk 138 with link 66 and moving it from its dotted line to its full line position to release the brake. Spring 148 automatically pivots disk 138 clockwise when the knob is released to allow the brake to set.

With reference to FIG. 1 and FIGS. 9–13, shell 14 is preferably made up of a plurality of separable segments 150. Each segment 150 is equal in axial length to the sum of the axial lengths of one disk 32 and one disk 34 so that the number of disks can be varied as desired and the shell readily adjusted to accommodate the particular number of disks.

Each segment is preferably formed as illustrated in FIGS. 10–13 to have a closed upper portion A with the remainder being provided with a plurality of tortuous openings. More particularly, portion A comprises a generally cross-shaped section (FIG. 11) which, when a number of segments are connected, provide a closed portion in the shell. Inner and outer portions 152 and 154 are relatively spaced around the remainder of the segment circumference and are joined by a continuous web 156. Portions 152 and 154 provide tortuous openings for passage of air while preventing splash of oil, water, or the like into the brake. For a similar purpose, opening 43 in shield 12 is provided with a cover 158, that is to permit passage of air while preventing ingress of water and oil or the like.

The openings in the shell and opening 43 in shield 12 provide air intake and exhaust openings for the brake with both disk assembly and the solenoid, the main source of heat within the brake, disposed between the intake and exhaust openings. Accordingly, the cooling air will pass over the solenoid and between the disks so that heat is effectively carried away from both these sources of heat.

In practice we have found that portion A can be made equal to approximately 120° more, i.e. approximately 60° on either side of the vertical center line in FIG. 10, and with the tortuous openings provided by portions 152 and 154 ingress of water, oil or the like is minimized to such an extent as to be practically negligible. This then provides a structure which includes adequate openings for free ingress and egress of air while practically eliminating the ingress of water, oil or the like.

The brake as described above will maintain a desired retarding torque while adjusting itself for disk wear thereby increasing the effective useful life of the brake while insuring optimum performance throughout that useful life. The brake is operable to effectuate desired high retarding torques while utilizing relatively lightweight elements by transmitting the force from those elements through force multiplying means. In addition to this extended and more effective useful life, the brakes is constructed so as to utilize the normal elements of the brake to produce a more effective flow of cooling air through the brake, i.e. it produces the air flow without adding any elements to the brake structure. This air flow is directed to the main heat generating area for most effective cooling.

Although this invention has been illustrated and described in connection with particular embodiments thereof, it will be apparent to those skilled in the art that various changes and modifications may be made therein without departing from the spirit of the invention or from the scope of the appended claims.

What we claim is:

1. Brake apparatus comprising, in combination, a plurality of stationary friction disks, a plurality of rotating metallic disks alternately arranged with said friction disks, said metallic disks including circumferentially spaced radially extending raised friction disk engaging surfaces, a brake housing including a plurality of separable segments arranged to provide an outer shell surrounding said disks and including a plurality of apertures arranged adjacent the periphery of said metallic disks, a pressure plate arranged for movement into and out of engagement with said disks to selectively clamp said disks to set said brake and release said disks for relative movement, a frame, a pressure arm pivotally connected at one end to said frame, means connecting said pressure arm to said pressure plate at a point intermediate the ends of the pressure arm, a solenoid, a first rack, a lever connecting said solenoid and said first rack, a second rack, means pivotally connecting the opposite end of said pressure arm to said second rack, a pinion connecting said first and second racks, an operator spring arranged with said solenoid and said lever so that said solenoid and said spring are operative to alternately move said pressure plate to set and release said brake, means providing an opening in said housing spaced from said shell apertures so that said metallic disks direct a flow of air through said brake over said solenoid and said friction disk engaging faces, said means for connecting said pressure arm to said second rack including a ratchet and screw combination connecting said pressure arm to said second rack for relative adjustable movement, and a pawl connected to and movable with said first rack, said pawl arranged for operative engagement with said ratchet when the setting movement of said pressure plate exceeds a preselected amount for rotating said screw to move said pressure arm relative to said disks to compensate for disk wear.

2. Rotary motion control apparatus comprising, in combination, a plurality of stationary disks, a plurality of rotating disks alternately arranged with said stationary disks and each having opposed undulating surfaces providing circumferentially spaced raised disk engaging areas, a housing including a plurality of separable segments surrounding said disks, a pressure plate coaxially arranged with said disks, a pressure arm connected to said pressure plate and pivotally supported relative to said disks for moving said pressure plate into and out of engagement with said disks to selectively clamp said disks against and release said disks for relative rotational movement, a solenoid, first rack means, second rack means, pinion means connecting said first and second rack means, first means connecting said pressure arm to said second rack means for adjustable movement therebetween to vary the position of said pressure plate relative to said disks, lever means connecting said solenoid to said first rack means, an operator spring, means connecting said operator spring to said lever means and for movement within a predetermined range to bias said pressure plate toward engagement with said disks with a preselected force, pawl means connected with and movable in accordance with said lever means movement, and ratchet means included in said first connecting means for moving said pressure arm relative to said second rack, said pawl means arranged for operative engagement with said ratchet means when the movement of said operator spring exceeds said predetermined range to adjust the position of said pressure plate relative to said disks in accordance with disk wear.

3. The combination of claim 2 including a stationary frame and wherein said pressure arm is pivotally connected at one end to said frame, at its opposite end to said second rack and intermediate its ends to said pressure plate.

4. The combination of claim 3 including means for connecting said pressure arm to said frame and said second rack and providing an axis of rotation for said pressure arm, and means connecting said pressure plate to said pressure arm for movement therewith and pivotal movement relative thereto about an axis extending generally normal to said axis of rotation.

5. The combination of claim 3 wherein said stationary disks are generally annular, said rotating disks include a plurality of apertures spaced inwardly of the disk engaging areas thereof, said housing segments include means for providing apertures in said housing adjacent the periphery of said rotating disks, and said housing includes an air intake aperture arranged with said solenoid intermediate it and said disks.

6. The combination of claim 5 wherein stationary disks comprise a friction material and said rotating disks comprise a metallic material.

7. Rotary motion control apparatus comprising, in combination, a plurality of alternately arranged normally stationary and rotating disks, said rotating disks having generally undulating opposed surfaces providing circumferentially spaced raised disk engaging portions housing means for said apparatus and including air intake and exhaust openings spaced apart with said disks therebetween, a pressure plate, first lever means connected to said pressure plate for moving said pressure plate into and out of engagement with said disks to selectively clamp said disks against and release said disks for relative movement, a solenoid, first rack means, second lever means connecting said solenoid and said first rack means, second rack means, pinion means connecting said first and second rack means, means for connecting said second rack means and said pressure plate for both joint and relative adjustable movement, an operator spring, means connecting said operator spring to said first lever means and for movement within a predetermined range to bias said pressure plate toward engagement with said disks with a preselected force, pawl means connected with and movable in response to movement of said first lever means, and ratchet means included in said adjustable connecting means, said pawl and ratchet means arranged for operative engagement when travel of said operator spring exceeds said predetermined range to adjust the position of said pressure plate relative to said disks and in accordance with disk wear.

8. Rotary motion control apparatus comprising, in combination, a plurality of relatively rotatable members, a pressure plate, first means for moving said pressure plate into and out of engagement with said relatively rotatable members to selectively clamp and release said members for relative rotation, said first means including first and second interconnected motion transmitting members, second means adjustably connecting said second motion transmitting member to said pressure plate, means connected to said first motion transmitting member and through said first motion transmitting member biasing said pressure plate toward clamping engagement with said relatively rotatable members, actuating means connected to said first motion transmitting member and operative through said first motion transmitting member to move said pressure plate against said bias out of said clamping engagement, said second means including a first pressure plate adjusting member connected to and movable with said pressure plate and connected to said second motion transmitting member for adjustable movement relative thereto to adjust said pressure plate relative to said relatively rotatable members, said second means also including a second pressure plate adjusting member connected with and movable in accordance with movement of said first motion transmitting member and arranged for operative engagement with said first adjusting member when movement of said pressure plate to clamp said relatively rotatable members exceeds a predetermined limit to move said first adjusting member to adjust said pressure plate relative to said relatively rotatable members.

9. Rotary motion control apparatus comprising, in combination, a plurality of alternately arranged normally stationary and rotating disks, housing means including air intake and exhaust openings spaced apart with said disks positioned therebetween, said rotating disks including circumferentially spaced radially extending raised portions for engaging said stationary disks and directing air between said intake and exhaust openings, a pressure plate, a solenoid, an operator spring, means connecting said solenoid and said operator spring to said pressure plate so that said operator spring biases said pressure plate in one direction and said solenoid acts against said spring to move said pressure plate in an opposite direction, whereby said pressure plate is movable into and out of clamping engagement with said disks, and means included in said connecting means for adjustably moving said pressure plate relative to said disks independently of said solenoid and said operator spring said adjusting means sensing and controlled in accordance with movement of said pressure plate to clamp said disks so that said pressure plate is moved relative to said disks in accordance with disk wear.

10. The combination of claim 9 wherein said means connecting said solenoid and said spring to said pressure plate includes force multiplying means.

11. An operator assembly adapted for use in combination with a plurality of alternately arranged normally stationary and rotatable disks and comprising, in combination, a pressure plate, a pressure arm connected to said pressure plate and supported at one end for pivotal movement to move said pressure plate into and out of clamping engagement with said disks, an actuator including an operator spring mounted for movement within predetermined limits to exert a preselected spring force and a solenoid operable in opposition to said spring force, first and second rack means, means providing a threaded engagement between the other end of said pressure arm and said second rack means and including ratchet means connected to and operative to move said other end of said pressure arm on said threaded connection, pinion means connecting said first and second rack means, lever means connecting said actuator to said first rack means so that said spring biases said pressure plate in one direction and said solenoid is operative to move said pressure plate against said spring force in an opposite direction, and pawl means connected to and movable with said lever means, said pawl means arranged to operatively engage said ratchet means when said movement of said operator spring exceeds said predetermined limits to actuate said threaded connection to move said pressure plate relative to said disks to compensate for said wear.

12. An operator assembly adapted for use in combination with a plurality of alternately arranged normally stationary and rotating disks and comprising, in combination a pressure plate, first lever means connected to said pressure plate for moving said pressure plate into and out of engagement with said disks to selectively clamp said disks against and release said disks for relative movement, a solenoid, first rack means, second lever means connecting said solenoid and said first rack means, second rack means, pinion means connecting said first and second rack means, means for connecting said second rack means and said pressure plate for both joint movement and relative adjustable movement, an operator spring connected to said first lever means and for movement within a predetermined range to bias said pressure plate toward engagement with said disks with a preselected force, pawl means connected to and movable in response to movement of said second lever means, and ratchet means included in said adjustable connecting means, said pawl and ratchet means arranged for operative engagement when travel of said operator spring exceeds said predetermined range to adjust the position of said pressure plate relative to said disks and in accordance with disk wear.

13. The combination of claim 12 including means for connecting said second lever means for pivotal movement relative to said disks and providing an axis of rotation for said second lever means, and means connecting said pressure plate to said lever means for movement therewith and pivotal movement relative thereto about an axis extending generally normal to said axis of rotation.

14. In rotary motion control apparatus including an actuator and a plurality of alternately arranged normally stationary and rotatable disks, means for transmitting movement between said actuator and disks to alternately clamp said disks against and release said disks for relative rotational movement, said means comprising an elongated pressure arm connected to said actuator means connecting said pressure arm for pivotal movement about one of its ends and for rotational movement about its longitudinal axis, a pressure plate engageable with said disks to effectuate said alternate movement, and means connecting said pressure plate to said pressure arm for movement therewith and for pivotal movement relative thereto about an axis extending generally normal to said longitudinal axis.

15. In rotary motion control apparatus including an actuator and at least two disks supported for relative rotational movement therebetween, means for transmitting motion between said actuator and said disks to alternately clamp said disks against and release said disks for said relative rotational movement, said means comprising an elongated member connected to said actuator, means connecting said elongated member for pivotal movement relative to said disks and for pivotal movement about its longitudinal axis, a pressure plate engageable with said disks to effectuate said alternate movement, and means connecting said pressure plate to said elongated member for movement therewith and for pivotal movement relative thereto about an axis extending generally normal to said longitudinal axis.

16. In rotary motion control apparatus including an actuator, at least one normally rotating member and a normally stationary member adjacent said normally rotating member; the combination of means for transmitting motion from said actuator to said normally rotating and normally stationary members to alternately clamp said members against and release said members for relative rotational movement, said means comprising an elongated member connected to said actuator, means connecting said elongated member for pivotal movement relative to said relatively rotatable members and for pivotal movement about its longitudinal axis, a pressure plate engageable with said relatively rotatable members to effectuate said alternate movement and means connecting said pressure plate to said elongated member for movement therewith and for pivotal movement relative thereto about an axis extending generally normal to said longitudinal axis.

17. An operator assembly adapted for use with a plurality of relatively rotatable disks and operative to selectively clamp said disks against rotation, said operator assembly comprising, in combination, a pressure plate arranged for movement into and out of engagement with said disks, a pressure arm connected to said pressure plate, a solenoid, an operator spring, a lever supported for pivotal movement about a point intermediate its ends, means connecting said solenoid and operator spring to said lever and supporting said spring for movement within a predetermined range, said operator spring biasing said lever in one direction about its pivotal axis and said solenoid acting against said bias when actuated, first rack means connected to and movable with said lever, second rack means, adjustable connecting means connecting said second rack means to said pressure plate for movement therewith and relative thereto, and pinion means connecting said first and second rack means, said adjustable connecting means including a rachet member connected between said second rack means and said pressure arm and operative when rotated to move said pressure arm relative to said second rack means, said adjustable connecting means also including a pawl connected to and movable with said first rack means, spring movement setting said brake and solenoid operation releasing the brake and said pawl arranged to engage said ratchet when said operator spring exceeds said predetremined range in setting said brake to rotate said ratchet and move said pressure arm when said brake is released by solenoid operation.

18. Rotary motion control apparatus comprising, in combination, a plurality of alternately arranged normally stationary and rotating disks, housing means including air intake and exhaust openings spaced apart with said disks positioned therebetween, said rotating disks including circumferentially spaced radially extending raised portions for engaging said stationary disks and directing air between said intake and exhaust openings, a pressure plate, electrical operating means, means connecting said electrical operating means to said pressure plate and operative to transmit movement from said electrical operating means to said pressure plate to move said pressure plate in opposite directions and selectively into and out of clamping engagement with said disks, and adjusting means included in said connecting means for adjustably moving said pressure plate relative to said disks independently of said electrical operating means, said adjusting means sensing and controlled in accordance with movement of said pressure plate to clamp said disks so that said pressure plate is moved relative to said disks in accordance with disk wear.

19. Rotary motion control apparatus comprising, in combination, a plurality of alternately arranged, normally stationary and rotating disks, means engageable with said disks for relatively clamping said disks against and releasing said disks for relative movement, operating means having a normal range of movement and movable in opposed directions within said range to effect movement of said clamping means, means adjustably connecting said operating means to said disk engaging means, said connecting means establishing a direct driving connection between said operating means and said disk engaging means to effectuate said relative movement between said disk engaging means and said disks and also establishing an adjustable connection therebetween providing adjustable relative movement of said disk engaging means with respect to said disks independently of said operating means, and means operatively associated with said connecting means and sensitive to movement of said disk engaging means and said operating means and operative, when movement of said disk engaging means exceeds a predetermined limit indicating said operating means has exceeded its normal range of movement, to manipulate said adjustable connection and move said disk engaging means relative to said disks to correct for said excess movement and maintain movement of said operating means within said range.

20. The combination of claim 19 wherein one of said disks includes circumferentially spaced raised disk engaging areas.

21. In combination, at least two members supported for selective relative rotational movement therebetween, actuating means operable in opposed directions within a given range of movement, first means engageable with said members for alternately clamping said members against and releasing said members for said relative movement, means connecting said actuating means to said first means for transmitting motion of said actuating means in opposed directions to said first means to effectuate said alternate clamping and releasing of said members, and means sensitive to the amount of movement of said first means to clamp said members against rotation and operative to adjust the position of said first means relative to said relative rotatable members by adjusting said first means toward said members during release movement of said first means and independently of said actuating means to thereby compensate for wear between said relatively movable members and maintain movement of said actuating means within said range and thereby maintain a substantially constant clamping force.

References Cited by the Examiner

UNITED STATES PATENTS

| | | | |
|---|---|---|---|
| 2,174,395 | 9/1939 | Aikman. | |
| 2,549,217 | 4/1951 | Mason | 188—264 |
| 2,555,183 | 5/1951 | Butler | 188—264 |
| 2,700,439 | 1/1955 | Hodgson | 188—171 |
| 2,816,631 | 12/1957 | Butler | 188—264 |
| 2,905,277 | 9/1959 | Cagle | 188—196 X |
| 2,939,551 | 6/1960 | Hansen | 188—171 |
| 3,095,068 | 6/1963 | Hansen | 188—171 |
| 3,171,514 | 3/1965 | Strain | 188—171 |

DUANE A. REGER, *Primary Examiner.*

ARTHUR L. LA POINT, *Examiner.*